US011336566B2

United States Patent
Murao et al.

(10) Patent No.: US 11,336,566 B2
(45) Date of Patent: May 17, 2022

(54) TRANSACTION FLOW MANAGEMENT BASED ON OPERATIONAL TROUBLES ON A MAAS PLATFORM

(71) Applicant: SONY GROUP CORPORATION, Tokyo (JP)

(72) Inventors: Sadayoshi Murao, Bangalore (IN); Madhvesh Sulibhavi, Bangalore (IN); Srinivasa Pingili, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/916,043

(22) Filed: Jun. 29, 2020

(65) Prior Publication Data
US 2021/0409314 A1  Dec. 30, 2021

(51) Int. Cl.
*H04L 12/725* (2013.01)
*H04L 45/30* (2022.01)
(Continued)

(52) U.S. Cl.
CPC .......... *H04L 45/306* (2013.01); *H04L 45/02* (2013.01); *H04L 45/22* (2013.01);
(Continued)

(58) Field of Classification Search
CPC ... H04W 72/048; H04W 24/00; H04W 28/20; H04W 72/042; H04W 74/085;
(Continued)

(56) References Cited

U.S. PATENT DOCUMENTS 9,178,805 B2   11/2015  Goel
2008/0316914 A1*  12/2008  Vercellone .............. H04L 43/50
                                                              370/216
(Continued)

FOREIGN PATENT DOCUMENTS

CN          108512935 A     9/2018
WO         2018/231255 A1  12/2018
WO      WO-2020064545 A1    4/2020

OTHER PUBLICATIONS

BOTHOS EFTHIMIOS MPTHIMOS@GMAIL.COM ET AL: "Leveraging Blockchain for Open Mobility-as-a-Service Ecosystems", Proceedings of the Seventh International Conference on Technological Ecosystems for Enhancing Multiculturality, ACMPUB27, New York, NY, USA, Oct. 14, 2019 (Oct. 14, 2019), pp. 292-296, XP058582431, DOI: 10.1145/3358695.3361844 ISBN: 978-1-4503-7718-8 the whole document.

(Continued)

*Primary Examiner* — Afshawn M Towfighi
(74) *Attorney, Agent, or Firm* — Chip Law Group

(57) ABSTRACT

A system and method for transaction flow management is provided. The system comprises a broker node device which collects operation information associated with a plurality of nodes of a MaaS network and determines an operational trouble associated one or more nodes of the plurality of nodes based on the collected operation information. The one or more nodes handle ticket transactions associated with a first trip plan of a sequence of trip plans included in a MaaS mobility service. The broker node device selects a first message routing policy based on the determined operational trouble and receives, based on the first message routing policy, a transaction message associated with the first trip plan from a first node of the first plurality of nodes. The broker node device routes the received transaction message (Continued)

to a second node of a same or different MaaS network based on the first message routing policy.

20 Claims, 5 Drawing Sheets

(51) Int. Cl.
*H04L 67/562* (2022.01)
*H04W 4/24* (2018.01)
*H04L 45/02* (2022.01)
*H04L 45/00* (2022.01)
*H04W 40/02* (2009.01)

(52) U.S. Cl.
CPC ........... *H04L 67/2809* (2013.01); *H04W 4/24* (2013.01); *H04W 40/02* (2013.01)

(58) Field of Classification Search
CPC ............. H04W 24/08; H04W 72/0413; H04W 56/0045; H04W 72/0453; H04L 5/001; H04L 5/0057; H04L 5/0094; H04L 5/0098; H04L 5/005; H04L 5/0064; H04L 5/0048; H04B 7/02
See application file for complete search history.

(56) References Cited

U.S. PATENT DOCUMENTS

| | | | | |
|---|---|---|---|---|
| 2018/0288726 | A1* | 10/2018 | Azgin | H04L 43/0864 |
| 2018/0317067 | A1* | 11/2018 | Ameixieira | H04W 4/46 |
| 2018/0350024 | A1* | 12/2018 | Kaufman | G06Q 10/0833 |
| 2020/0351192 | A1* | 11/2020 | Murao | H04L 67/26 |

OTHER PUBLICATIONS

Lamberti Robin et al: "An Open Multimodal Mobility Platform Based on Distributed Ledger Technology", Sep. 12, 2019 (Sep. 12, 2019), Advances in Databases and Information Systems; [Lecture Notes in Computer Science; Lect. Notes Computer], Springer International Publishing, Cham, pp. 41-52, XP047520991, ISBN: 978-3-319-10403-4 [retrieved on Sep. 12, 2019] the whole document.

Nguyen Tri Hong et al: "Blockchain-Based Mobility-as-a-Service", 2019 28th International Conference on Computer Communication and Networks (ICCCN). IEEE, Jul. 29, 2019 (Jul. 29, 2019), pp. 1-6, XP033620550, DOI: 10.1109/ICCCN.2019.8847027 [retrieved on Sep. 23, 2019] the whole document.

* cited by examiner

TRANSACTION FLOW MANAGEMENT BASED ON OPERATIONAL TROUBLES ON A MAAS PLATFORM

CROSS-REFERENCE TO RELATED APPLICATIONS/INCORPORATION BY REFERENCE

None.

FIELD

Various embodiments of the disclosure relate to Mobility-as-a-Service (MaaS) and distributed ledger technology. More specifically, various embodiments of the disclosure relate to a system and method for transaction flow management based on operational troubles on a MaaS platform.

BACKGROUND

In a traditional Mobility-as-a-Service (MaaS) platform, multiple mobility providers may provide their services through infrastructures, which may be based on a closed platform. Each of such mobility provider may have a separate ticket processing infrastructure (e.g., ticketing gates and Point-of-Sale (PoS) devices) or a separate application (e.g., a ticket booking application, ticket processing application, and a ride hailing application) to create, pay for, or manage a trip.

On such a MaaS platform, many operational issues of ticketing terminals and other nodes of the MaaS platform may go undetected, which may lead to failure of transactions and consequent operational downtimes. It may take much longer time than required to resolve such operational issues and prevent operational bottlenecks in functioning of the conventional MaaS platform.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for transaction flow management based on operational troubles on a Mobility-as-a-Service (MaaS) platform is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
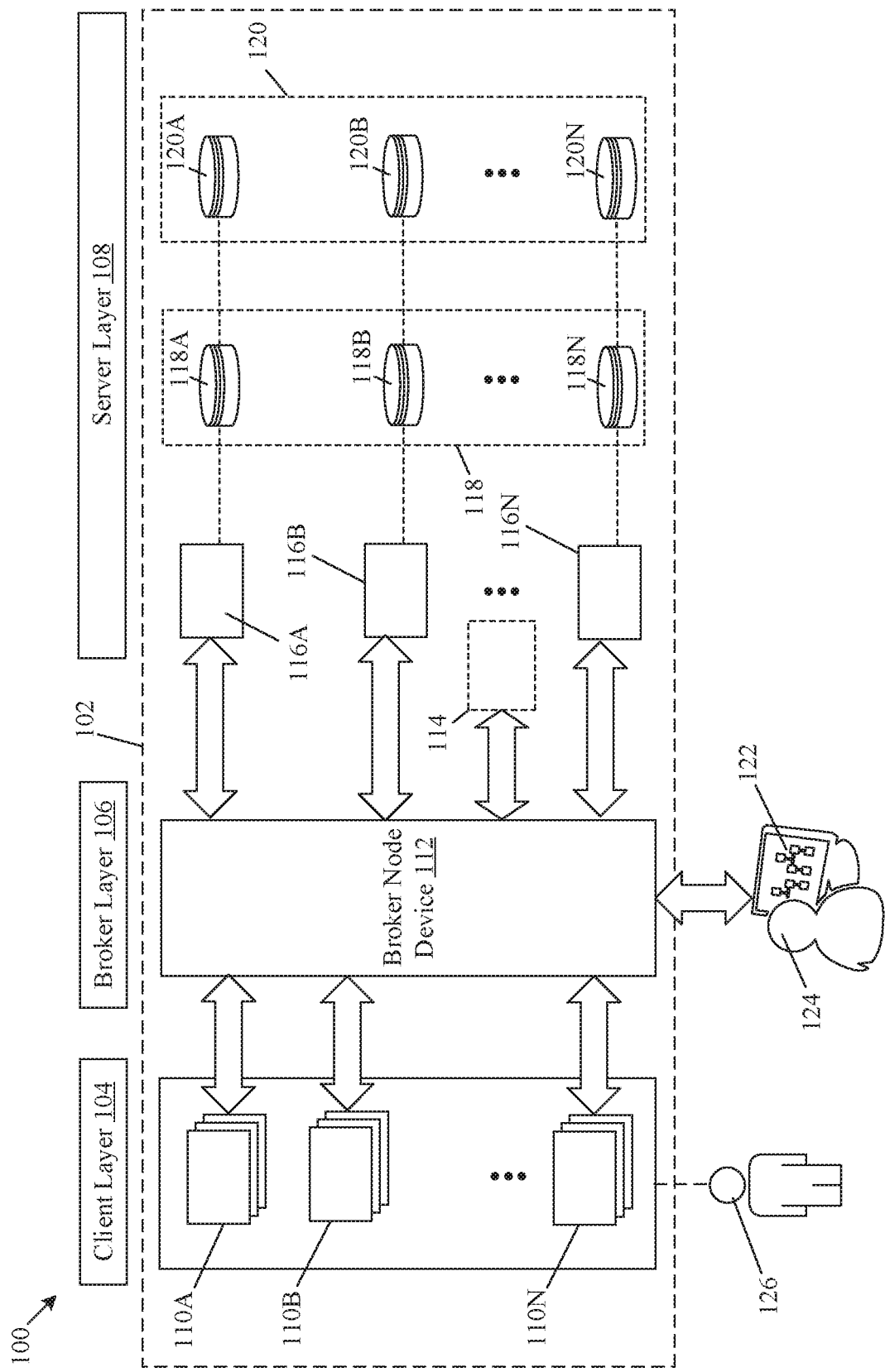
FIG. 1 is a diagram of an exemplary network environment for transaction flow management based on operational troubles on a Mobility-as-a-Service (MaaS) network, in accordance with an embodiment of the disclosure.

The following described implementations may be found in the disclosed system and method for transaction flow management based on operational troubles on a Mobility-as-a-Service (MaaS) platform. The disclosed system may be a part of a federated transportation management system that may facilitate multiple homogeneous or heterogenous mobility providers and their infrastructure, such as ticketing gates, applications, and/or Point of Sale (PoS) devices to operate on the MaaS network to provide various mobility services. Each mobility provider may enjoy secure data ownership and may control co-use of relevant transaction data through a distributed ledger. This may enhance connectivity between the various mobility providers.

Exemplary aspects of the disclosure provide a system that may include a broker node device associated with one or more MaaS networks. The broker node device may be configured to collect operation information (such as network connectivity status and a device operational status) associated with a plurality of nodes of a MaaS network to determine an operational trouble associated with one or more nodes of the plurality of nodes based on the collected operation information. The one or more nodes may be nodes that may handle ticket transactions associated with a trip plan of a sequence of trip plans included in a MaaS mobility service. For example, the one or more nodes may include publisher nodes of the MaaS network, subscriber nodes of the MaaS network, or nodes of a distributed ledger associated with the subscriber nodes of the MaaS network. Examples of the operational troubles of the one or more nodes may include, but are not limited to, a network connectivity failure, an operational failure, an application error, an overload of message handling capacity, an inability to process ticket transactions due to unavailability of a transport vehicle at a planned trip time or a delayed arrival of the transport vehicle for a pickup or drop in comparison to the planned trip time.

Based on the determined operational trouble, the broker node device may select a message routing policy from a set of message routing policies (such as situation-based routing policies or trouble-based routing policies). Based on the selected message routing policy, the broker node device may receive a transaction message associated with the trip plan from a first node of the plurality of nodes of the MaaS network. The first node may be a publisher node of the MaaS network. Examples of the transaction message may include, but are not limited to, a create message (on a creation or issuance of a ticket for the mobility service), a get-in message (to begin the mobility service for the user), and a get-out message (upon completion of the mobility service for the user).

The broker node device may be configured to route the received transaction message to a second node of the plurality of nodes of the MaaS network based on the selected message routing policy. As an example, the second node may be a subscriber node, a node of a distributed ledger associated with the MaaS network, or a backup node in case the subscriber node and/or the node of the distributed ledger are operationally troubled. Herein, the first node and the second node may be different from the one or more nodes (that may be determined to be operational troubled).

The policy-based routing of transaction messages may ensure that the transaction flow (i.e., transmission of transaction messages) through the MaaS network is unaffected by downtime or any operational issue of any node (whether a publisher node, subscriber node, or a node of the distributed ledger) of the MaaS network. This may improve an uptime of the MaaS network and ensure that transactions may be properly executed by the MaaS network so that users may experience minimum lag or performance issues due to operational troubles of the different nodes of the MaaS network.

In contrast, conventional systems may lack a feature of run-time monitoring of nodes of the MaaS network and identification of failures associated with the nodes of the MaaS network. The failures associated with the nodes may be due to various reasons including, but not limited to, traffic accidents of vehicles of the mobility providers of the MaaS network, malfunction of nodes, or an abrupt transaction load on the nodes. Various issues faced by conventional systems may include a limited availability of transport vehicles due to traffic jams or accidents and operational troubles associated with facility or Information Technology (IT) infrastructure of the mobility providers. Further, conventional systems may have interconnectivity issues and may not support features like ticket transfer and roaming tickets, as provided by the disclosure.

FIG. 1 is a diagram of an exemplary network environment for transaction flow management based on operational troubles on a Mobility-as-a-Service (MaaS) network, in accordance with an embodiment of the disclosure. With reference to FIG. 1, there is shown a block diagram of a network environment 100. The network environment 100 may include a first MaaS network 102, which may be associated with a publish-subscribe pattern. The first MaaS network 102 may include a first plurality of nodes, which may be configured in layers, such as a client layer 104, a broker layer 106, and a server layer 108. The first plurality of nodes may include a plurality of publisher nodes 110 in the client layer 104; a broker node device 112 in the broker layer 106; and a first plurality of subscriber nodes 116A, 116B, . . . 116N, a plurality of mobility-provider (MP) nodes 118A, 118B, . . . 118N, and a plurality of MaaS nodes 120A, 120B, . . . 120N in the server layer 108. The plurality of publisher nodes 110 in the client layer 104 may be configured to communicate with the first plurality of subscriber nodes 116A, 116B, . . . 116N through the broker node device 112.

Though a single broker node device 112 is shown in FIG. 1, the scope of the disclosure may not so be limited. In an embodiment, the network environment 100 may include more than one broker node devices 112, without departure from the scope of the disclosure.

The plurality of publisher nodes 110 may include a first publisher node 110A, a second publisher node 110B, . . . and an Nth publisher node 110N. The first plurality of subscriber nodes 116A, 116B, . . . 116N may include a first subscriber node 116A, a second subscriber node 116B, . . . and an Nth subscriber node 116N. In an embodiment, each of the plurality of subscriber nodes 116A, 116B, . . . 116N may be interfaced with the broker node device 112 through a plug-in for communication of data (e.g., transaction messages). Each of the first plurality of subscriber nodes 116A, 116B, . . . 116N may be associated with a respective MP node and a respective MaaS node. For example, the first subscriber node 116A may be associated with each of an MP node 118A and a MaaS node 120A. Further, the second subscriber node 116B may be associated with each of an MP node 118B and a MaaS node 120B. Similarly, the Nth subscriber node 116N may be associated with each of an MP node 118N and a MaaS node 120N.

The network environment 100 may further include an administrator device 122, which may be operated by an administrator 124 of the first MaaS network 102. In the network environment 100, there is further shown a user 126 who may interact with the plurality of publisher nodes 110 to avail mobility services from different mobility providers of the first MaaS network 102.

The first MaaS network 102 may include a network of nodes, such as the first plurality of nodes which may be configured to operate in the client layer 104, the broker layer 106, and the server layer 108. The first MaaS network 102 may handle transactions for a MaaS mobility service associated with multiple mobility providers. Each of such mobility providers may own, lease, or manage a cluster of nodes in each of the client layer 104 and the server layer 108 of the first MaaS network 102. For example, the first publisher node 110A, the first subscriber node 116A, and the MP node 118A may be associated with a first mobility provider. The second publisher node 110B, the second subscriber node 116B, and the MP node 118B may be associated with a second mobility provider which may be different from the first mobility provider.

The MaaS mobility service may be provided by homogeneous mobility providers (such as multiple cab ride provider companies or multiple rail companies) or heterogenous mobility providers through a homogenous group of devices, applications, or ticketing gates, or a heterogenous group of ticketing gates, applications, and Point of Sale (PoS) devices. The MaaS mobility service may be a combination of individual service offerings of one or more homogenous or heterogeneous mobility providers. The MaaS mobility service may include, for example, a train service, a bus service, a taxi/cab service, a metro rail service, an air-plane service, a fleet service, a ride hailing service, a car sharing service, a carpool service, a car rental service, a bike sharing service, or a combination thereof.

Each of the plurality of publisher nodes 110A, 110B, . . . 110N may include a suitable logic, circuitry, code, and/or interface that may be configured to operate as a ticket processing client for a mobility service of a respective mobility provider. For example, as a ticket processing client, each of the first publisher node 110A, the second publisher node 110B, . . . and the Nth publisher node 110N may read, issue, recharge, or cancel tickets to create events associated with a respective mobility service. Based on such events, transaction messages may be communicated to one or more subscriber nodes of the first MaaS network 102 or other MaaS networks, through the broker node device 112. Examples of a publisher node may include, but are not limited to, a consumer electronic device with a trip planning or booking application, a ticket reader on a ticketing gate, a ticketing kiosk a Point-of-Sale (PoS) device, a mobile POS, a ticket vending machine, a smart door of a transport vehicle which may read a ticket to start or end a ride.

The broker node device 112 may include suitable logic, circuitry, code, and/or interfaces that may be configured to route transaction messages from a publisher node (such as the first publisher node 110A) to a suitable node, such as a subscriber node or a backup (or temporary) node (e.g., a backup node 114) of the first MaaS network 102. The broker node device 112 may route the transaction messages based on a message routing policy, which may be a trouble-based routing policy or a situation-based routing policy. The broker node device 112 may maintain routing information, which may establish relationship between publisher-subscriber nodes, different MP-MP nodes, and different MaaS-MaaS nodes. Example implementations of the broker node device 112 may include, but are not limited to, an application server, a cloud server, a mainframe server, a database server, a web server, or other type of servers.

The broker node device 112 may be configured to communicate with each of the plurality of publisher nodes 110A, 110B, . . . 110N and each of a first plurality of subscriber nodes 116A, 116B, . . . 116N through a suitable publish-subscribe network protocol, such as but not limited to, a Message Queuing Telemetry Transport (MQTT)-based messaging protocol, an Advanced Message Queuing Protocol (AMQP)-based messaging protocol, or a Message-Oriented Middleware (MOM)-based messaging framework.

The backup node 114 may include suitable logic, circuitry, code, and/or interfaces that may be configured to backup or temporarily store transaction messages associated with an operationally troubled subscriber node or an MP node of the first MaaS network 102. The backup node 114 may be configured to receive, from a publisher node, via the broker node device 112, the transaction messages on behalf of the operationally troubled subscriber nodes or MP nodes and temporarily store such received transaction messages till the operationally troubled subscriber nodes or MP nodes are functional. Once the operationally troubled subscriber nodes or MP nodes are functional, the backup node 114 may forward the temporarily stored transaction messages to such subscriber nodes or MP nodes. Example implementations of the backup node 114 may include, but are not limited to, a database server, a web server, an edge device, an edge node, a cloud server, a cluster of cloud-based servers, a workstation, or any computing device with a fog or cloud computing capability.

Each of the first plurality of subscriber nodes 116A, 116B, . . . 116N may include suitable logic, circuitry, code, and/or interfaces that may be configured to receive the transaction messages through the broker node device 112 from one or more of the plurality of publisher nodes 110A, 1108, . . . 110N. In an embodiment, each of the plurality of subscriber nodes 116A, 1168, . . . 116N may be interfaced with the broker node device 112 through a plug-in for communication of data (e.g., transaction messages). Each transaction message may include a topic which may be subscribed by one or more subscriber nodes of the first plurality of subscriber nodes 116A, 116B, . . . 116N. Example implementations of a subscriber node may include, but are not limited to, a web server, an edge device, an edge node, a cloud server, a cluster of cloud-based servers, a workstation, or any computing device with a fog or cloud computing capability.

Each of MP nodes 118A, 1188, . . . 118N may include suitable logic, circuitry, code, and/or interfaces that may be configured to store transaction data associated with a respective mobility provider. For example, the MP node 118A may store transaction data associated with a first mobility provider. The transaction data may include records of trips of users. Each trip may correspond to a mobility service that may be provided by the first mobility provider in at least one leg of the journey. Each of the MP nodes 118A, 1188, . . . 118N may be referred to as nodes of a distributed ledger 118 that may store transaction data of the various mobility providers of the first MaaS network 102.

Each of the MaaS nodes 120A, 120B, . . . 120N may include suitable logic, circuitry, code, and/or interfaces that may be configured to store transaction data associated with all mobility providers of the first MaaS network 102. The storage of the transaction data associated with each of the mobility providers may be used to settle transactions of trips amongst the mobility providers that offer mobility services to users. Each of the MaaS nodes 120A, 1208, . . . 120N may correspond to nodes of a distributed ledger 120 that may store transaction data associated with the first MaaS network 102.

In an embodiment, at least two nodes of each of the distributed ledger 118 and/or the distributed ledger 120 may store transaction data associated with a MaaS mobility service. The transaction data associated with the MaaS mobility service may be included in a set of state objects, such as an initial state object and an updated version of the initial state object. Each state object may include a smart contract, a contract code (or rules of a transaction upon which parties to the transaction agree), and state properties (that may be updated when the transaction data is updated based on transaction messages from publisher node).

In at least one embodiment, each of the distributed ledger 118 and the distributed ledger 120 may be a decentralized and distributed database system which may maintain an immutable record of data operations or transactions. A set of data operations may be grouped together as a block and may be further linked to a previous block of data operations to form a chain of blocks. All blocks of data operations may be stored in a decentralized manner, whereby at least two participants or nodes of the distributed ledger 118 and the distributed ledger 120 may store a subset of blocks associated with one or more transactions in which the at least two participants or nodes may participate. Further, each of the distributed ledger 118 and the distributed ledger 120 may include an operating system (for example, a Java Virtual Machine (JVM)) which may allow for deployment of a smart contract between multiple parties, for example, mobility providers and a MaaS provider of the first MaaS network 102.

By way of example, and not limitation, each of the distributed ledger 118 and the distributed ledger 120 may be a Corda blockchain, an Ethereum blockchain, or a Hyperledger blockchain. Each of the distributed ledger 118 and the distributed ledger 120 may store a set of immutable state objects that may be tracked by the respective distributed ledgers. The state object may include transaction data, such as a smart contract between parties, contract code (rules of transaction), and content including state properties with certain state values. The smart contract may include a set of conditions under which multiple parties to the smart contract may agree to interact with each other. The smart contract may run on one or more nodes of the respective distributed ledgers and may govern transitions between state objects to generate a transaction. The smart contract may be written once, reused for a large numbers of state objects, and may refer to a governing legal prose by way of cryptographic hashes.

Each of the distributed ledger 118 and the distributed ledger 120 may use secure cryptographic hashes to identify parties and data and also to link a state object to a previous version of the state object to provide a chain of provenance. A transaction between a group of parties may be stored on the respective distributed ledgers such that only the group of parties associated with the transaction may be able to view the transaction. A party associated with a transaction may store a current state object of the transaction in a vault (i.e.

a database associated with a respective distributed ledger). Another party eligible to view or process the transaction (e.g., validate the transaction) may retrieve the current state object of the transaction from the vault. Additionally, each state object of the respective distributed ledgers may include a smart contract between the parties or nodes that may participate in an associated transaction.

On each of the distributed ledger 118 and the distributed ledger 120, a participant or a node (for example, the MP node 118A and/or the MaaS node 120A) may update a transaction by updating state properties of an input state object to produce an output state object. The updated transaction may thereby create a chain of provenance which may be associated with the transaction data. Each of the distributed ledger 118 and the distributed ledger 120 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. Further, a uniqueness of the updated transaction may be determined based on a check that there exists no other transaction that has reached a consensus by use of the same input state object as the current transaction.

In accordance with an embodiment, each of the distributed ledger 118 and the distributed ledger 120 may be associated with a decentralized application that may include a client-side interface (a front-end) and a server-side interface (a back end). The decentralized application may be configured to implement a workflow (e.g., a Corda flow) to record a transaction on a node of the respective distributed ledger (such as the MP node 118A and/or the MaaS node 120A). The client-side interface may be hosted on each of the first plurality of subscriber nodes 116A, 1168, . . . 116N and the client-side interface may be configured to load up on a client associated with a subscriber node. For example, the client-side interface of the decentralized application may be a Remote Procedure Call (RPC) client that may be configured on each subscriber node. The server-side interface of the decentralized application may run on each node of the distributed ledger 118 and the distributed ledger 120.

In an embodiment, each of the MP node 118A and the MaaS node 120A may be configured to receive a transaction message via the first subscriber node 116A. The MP node 118A may update the initial state object associated with each of the distributed ledger 118 and the distributed ledger 120 based on the transaction message to output an updated state object. Each of the MP node 118A and the MaaS node 120A may build a transaction that may include the initial state object with initial transaction data and the updated state object with updated transaction data.

In operation, the broker node device 112 may collect operation information associated with a first plurality of nodes of the first MaaS network 102. Examples of the collected operation information may include, but are not limited to, a network connectivity status and a device operational status of each node of the first plurality of nodes.

In an embodiment, the broker node device 112 may also collect traffic information associated with an on-road fleet of transport vehicles of one or more mobility providers affiliated to the first MaaS network 102. The collected traffic information may include, for example, traffic congestion information, traffic collision information, detour information, information associated with a less than average traffic, and the like. For example, the broker node device 112 may collect the traffic information from Internet-of-Things (IoT) sensors that may be deployed on each vehicle of the on-road fleet of transport vehicles. Such sensors may determine a location of the vehicle, a temperature, a number of vehicles in vicinity, and a number of people who may be currently traveling in the vehicle. In some instances, the traffic information may be collected through an application programming interface (API) of a data aggregator for traffic information.

The broker node device 112 may determine an operational trouble associated with one or more nodes (hereinafter, referred to as operationally troubled node(s)) of the first plurality of nodes based on the collected operation information. Examples of the operational troubles may include, but are not limited to, a network connectivity failure, an operational failure, an application error, an overload of message handling capacity, an inability to process ticket transactions due to unavailability of a transport vehicle at a planned trip time or a delayed arrival of the transport vehicle for a pickup or drop in comparison to the planned trip time. In an embodiment, the broker node device 112 may determine the operational trouble associated with the operationally troubled node(s) of the first MaaS network 102 further based on the collected traffic information.

In order to ensure that a transaction flow associated with the operationally troubled node(s) is not impacted, a suitable message routing policy may be required to handle transactions, critically dependent on operations of the operationally troubled node(s). The broker node device 112 may select a first message routing policy from a set of message routing policies. Such a selection may be based on the determined operational trouble.

In an embodiment, the set of message routing policies may include trouble-based routing policies and situation-based routing policies. Details of such policies are provided, for example, in FIG. 2. In such a case, the first message routing may be selected as one or more of the trouble-based routing policies and the situation-based routing policies. The selected first message routing policy may specify options that the broker node device 112 may select and implement to handle transaction messages associated the operationally troubled node(s) of the first MaaS network 102. Such operations may facilitate the broker node device 112 to mitigate the effect of the determined operation trouble on the first MaaS network 102.

In an embodiment, the first message routing policy may be selected based on whether the operationally troubled node(s) belong to the client layer 104, the server layer 108, or both the client layer 104 and the server layer 108. In case the operationally troubled node(s) include the broker node device 112, the entire operation of the first MaaS network may suffer a downtime.

In another embodiment, the broker node device 112 may control the administrator device 122 to display information, including but not limited to, the determined operational trouble of the operationally troubled node(s) and the collected operation information of the first plurality of nodes. The displayed information may also include the traffic information associated with the on-road fleet of transport vehicles of the one or more mobility providers. Thereafter, the broker node device 112 may control the administrator device 122 to display a set of user-selectable options based on the displayed information. Each of the set of user-selectable options may correspond to one of: the set of message routing policies. The broker node device 112 may receive, via the administrator device 122, an admin input from the administrator 124. The admin input may include a selection of a first user-selectable option of the set of user-selectable options. The first message routing policy may be selected based on the received admin input.

In an embodiment, it may be determined whether the operationally troubled node(s) of the first MaaS network 102 include an operationally troubled publisher node which is not able publish a transaction message for a first trip plan of the user to the broker node device 112. In case the operationally troubled node(s) does not include an operationally troubled publisher node, the broker node device 112 may receive the transaction message associated with the first trip plan from a first node of the first plurality of nodes of the first MaaS network 102. The first node may be a publisher node (such as the first publisher node 110A) which may be configured to publish the transaction message for the first trip plan to the broker node device 112.

Figure 2:
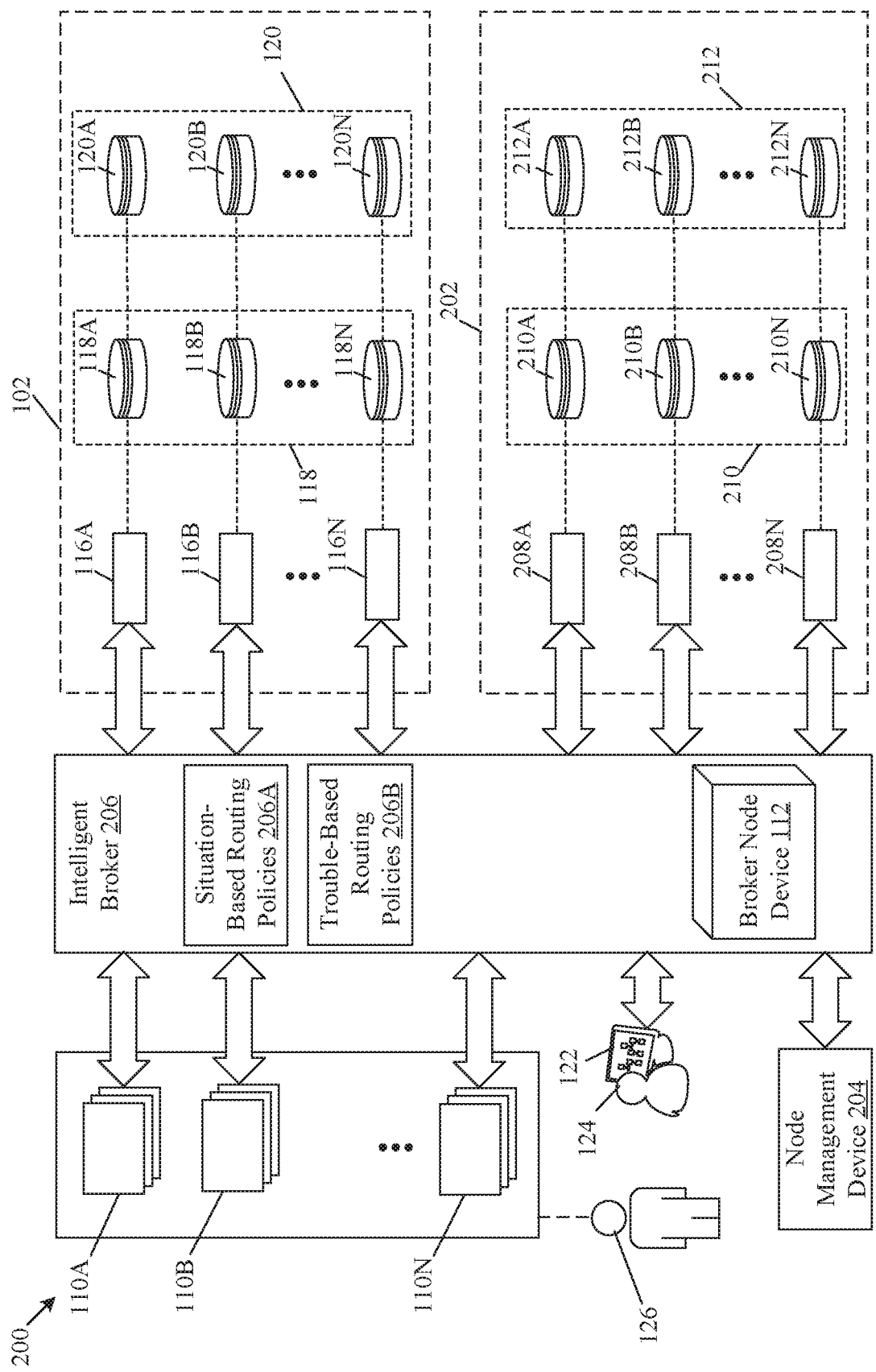
FIG. 2 is a diagram of an exemplary network environment for transaction flow management based on operational troubles on nodes of multiple-connected Mobility-as-a-Service (MaaS) networks, in accordance with an embodiment of the disclosure.

In case the operationally troubled node(s) of the first MaaS network 102 include an operationally troubled publisher node, then the broker node device 112 may select an alternate publisher node (i.e. the first node) of the first MaaS network 102 as a substitute for the operationally troubled publisher node. Such selection may be based on the first message routing policy. The alternative publisher node may belong to the first MaaS network 102 (in case of an intra-routing policy, described in FIG. 2) or a different MaaS network (as shown in FIG. 2, for example, in case of an inter-routing policy). For example, if there is an operational trouble associated with the first publisher node 110A, then the second publisher node 110B may be selected as the first node (i.e. the alternate publisher node). After the selection, the second publisher node 110B may publish the transaction message for the first trip plan to the broker node device 112.

In an embodiment, the alternate publisher node (such as the second publisher node 110B) may be selected from a cluster of publisher nodes of a mobility provider which may be same as the mobility provider associated with the operationally troubled publisher node (such as the first publisher node 110A). Such selection may be performed, for example, when one of the ticket readers (i.e. a publisher node) on a station is faulty and a replacement for the faulty ticket reader is available. In another embodiment, the alternate publisher node may be selected from a cluster of publisher nodes of another mobility provider which may be different from that of the operationally troubled publisher node. Such selection may be performed, for example, when there are no transport vehicles of the mobility provider for pickup at a scheduled time due to traffic congestion or accidents, or when all the ticketing terminals at the station are under scheduled or unscheduled maintenance.

The alternate publisher node may generate a transaction message for the first trip plan of the user (on behalf of the operationally troubled publisher node) and may transmit the generated transaction message to the broker node device 112. Examples of the transaction message may include, but are not limited to, a create message (on a creation or issuance of a ticket for the mobility service), a get-in message (to begin the mobility service for the user), and a get-out message (upon completion of the mobility service for the user).

After the transaction message is received, the broker node device 112 may route the received transaction message to a second node of the first plurality of nodes of the first MaaS network 102 based on the selected first message routing policy. The second node may be a subscriber node (such as the first subscriber node 116A) or a backup node 114. The backup node 114 may temporarily store the transaction message in case one or more of the first plurality of subscriber nodes 116A, 116B, . . . 116N and/or the MP nodes 118A, 118B, . . . 118N are operationally troubled.

In an embodiment, it may be determined whether the operationally troubled node(s) of the first MaaS network 102 include an operationally troubled subscriber node of the first MaaS network 102. In case the operationally troubled node(s) does not include an operationally troubled subscriber node, the broker node device 112 may transmit the transaction message associated with the first trip plan to a subscriber node (i.e. the second node) of the first MaaS network 102. The subscriber node (such as the first subscriber node 116A) may be configured to receive the transmitted transaction message associated with the first trip plan.

In an embodiment, if the operationally troubled node(s) of the first MaaS network 102 include an operationally troubled subscriber node (such as the first subscriber node 116A), then the broker node device 112 may select, as the second node, an alternate subscriber node (such as the second subscriber node 116B) from the first plurality of nodes of the first MaaS network 102. Alternatively, instead of an alternate subscriber node, the backup node 114 of the first MaaS network 102 may be selected as the second node. Such selection of the alternative subscriber node or the backup node 114 may be based on the first message routing policy.

The alternative subscriber node may belong to the first MaaS network 102 (in case of an intra-routing policy, described in FIG. 2) or a different MaaS network (as shown in FIG. 2, for example, in case of an inter-MaaS routing policy, described in FIG. 2). In an embodiment, the alternate subscriber node may be selected from a cluster of subscriber nodes of a mobility provider which may be the same as the mobility provider associated with the operationally troubled subscriber node. Such selection may be performed, for example, when subscriber nodes are down due to a scheduled or unscheduled maintenance. In another embodiment, the selected alternate subscriber node may be associated with a first mobility provider which may be different from a second mobility provider associated with the operationally troubled subscriber node. After selection, the alternate subscriber node may receive the transaction message for the first trip plan of the user on behalf of the operationally troubled subscriber node.

In an embodiment, it may be determined whether the operationally troubled node(s) include an operationally troubled node of a distributed ledger (such as the distributed ledger 118 or the distributed ledger 120). In case the operationally troubled node(s) include an operationally troubled node (such as the MP node 118A) of the distributed ledger, the broker node device 112 may select, as the second node, the backup node 114 from the first plurality of nodes of the first MaaS network 102. The backup node 114 may be selected based on the selected first message routing policy. After selection, the broker node device 112 may route the transaction message from the first node to the backup node 114 for a temporary storage till a recovery of the operationally troubled node (such as the MP node 118A) of the distributed ledger (such as the distributed ledger 118) is complete.

In another embodiment, the operationally troubled node(s) may include both the operationally troubled node of a distributed ledger and a subscriber node of the first MaaS network 102. In such a case, the broker node device 112 may select, as the second node, the backup node 114 from the first plurality of nodes of the first MaaS network 102 based on the selected first message routing policy. After selection, the broker node device 112 may route the transaction message from the first node to the backup node 114 for a temporary storage till the recovery of the operationally troubled node of the distributed ledger and the subscriber node is complete. After the recovery is complete, the broker node device 112 or the administrator device 122 may instruct the backup node 114 to reroute the stored transaction message to the operationally troubled subscriber node or the operationally troubled node of the distributed ledger.

In described embodiments, the policy-based selection of appropriate route from the client layer 104 and the server layer 108 may ensure that the transaction flow of transaction messages on the first MaaS network 102 may have little to no impact of any downtime or any operational trouble on nodes (whether a publisher node, subscriber node, and/or a node of the distributed ledger) of the first MaaS network 102. This may improve an uptime of the first MaaS network 102 and may ensure that transactions are properly executed by the MaaS network so that users may experience minimum performance issues, experienced typically due to operational troubles of the different nodes of the first MaaS network 102.

The first subscriber node 116A may receive the transaction message from the broker node device 112 and may share the transaction message with the MP node 118A and the MaaS node 120A. Each of the MP node 118A and the MaaS node 120A may receive the transaction message and may execute a transaction associated with the first mobility service based on information associated with an event captured in the received transaction message. To execute the transaction, each of MP node 118A and the MaaS node 120A may retrieve the initial state object and may update transaction data included in the first state object based on the received transaction message. The transaction data may be associated with information, such as but not limited to, ticketing information, subscription information, payment information, revenue sharing information, or mobility service information. In an embodiment, the transaction data may include metadata that may be used by the MP nodes or MaaS nodes for transaction handling and payment processing. The metadata may include data associated with calculation of payment related to a transaction in case of a region-routing (roaming), an inter-routing or intra-routing scenarios. For example, the metadata may include a reason code (such as an event identifier (ID) or a transaction type ID) to identify the type of message routing policy used and other details related to the nodes involved in the transaction. Further, the broker node device 112 may add details (such as a user ID) to identify the user 126 associated with the transaction in the metadata to support transaction handling by the MP nodes and/or the MaaS nodes of the first MaaS network 102 (and/or a different MaaS network, as shown in FIG. 2, for example). The broker node device 112 may also add details (such as, a user subscription type) to identify a user payment plan or a user subscription associated with the first MaaS network 102.

In an exemplary scenario, a mobility service may be created for a scheduled travel plan of the user 126 to ride a bus at 11:00 AM to airport, board a flight at 1:00 PM from the airport, followed by a cab ride at 8:00 PM from the airport to a hotel. For the bus ride, when the user 126 starts the bus ride, a publisher node associated with the bus ride provider may transmit a transaction message to a subscriber node of the bus ride provider. The transaction message may be a get-in message including details of trip (such as a pickup or drop location, a pickup time, etc.), subscription details, or user details. When the user 126 deboards the bus at end of a journey, the publisher node associated with the bus ride provider may again transmit a transaction message to the subscriber node of the bus ride provider. The transaction message may be a get-out message including trip details (such as a trip time, drop location, etc.), subscription details, trip bill, or user details. The subscriber node may forward the get-in message or the get-out message to its associated node of the distributed ledger 118 and the distributed ledger 120. The associated node of the distributed ledger 118 and the distributed ledger 120 may update the initial state object to produce a new state object with updated transaction data based on the get-in message or the get-out message.

For example, if the state properties of the initial state object include a total paid amount of 500 US Dollars (USD) for the (multi-trip) MaaS mobility service, then the updated transaction data of the new state object may include the total paid amount and a billed amount of 10 USD for the trip associated with the bus ride provider. Similarly, for all other trips (flight and cab to hotel) of the MaaS mobility service, respective nodes of the distributed ledger 118 for the flight provider and the cab ride provider and the respective nodes of the distributed ledger 120 may update the new state object sequentially in the order in which the user 126 may complete a trip with the flight and a trip with the cab. At the end of the last trip, the MP nodes and the MaaS nodes of the first MaaS network 102 may handle payment processing and revenue sharing based on the transaction data and the metadata associated with the transaction data, as discussed in the aforementioned.

In at least one embodiment, the first MaaS network 102 may support an open standard specification for MaaS. In such a case, publisher nodes (e.g., ticket readers or sensor devices) of different companies associated with various mobility providers of the first MaaS network 102 may join the first MaaS network 102 as homogeneous publisher nodes. Additionally, legacy ticket readers or sensor devices may connect to the first MaaS network 102 based on leverage of standard communication protocols, such as, MQTT or AMQP. By use of standard communication protocols, the first MaaS network 102 may provide ticket roaming functionality to users. For example, a ticket reader of any mobility provider may scan an electronic ticket of a user for a MaaS mobility service and may provide the respective mobility service of the mobility provider to the user (irrespective of the issuer of the ticket) based on seamless and secure access of the first MaaS network 102.

The MaaS mobility service may be provided by homogeneous mobility providers (e.g., multiple cab ride provider companies) or heterogenous mobility providers (multimodal mobility providers) through a homogenous group of devices, applications, or ticketing gates, or a heterogenous group of ticketing gates, applications, and PoS devices of various mobility providers. The MaaS mobility service may be a combination of individual service offerings of one or more homogenous or heterogeneous mobility providers. For example, a ticketing gate, a ride hailing app, or a PoS terminal of a MaaS provider may receive a request for creation of a MaaS mobility service (e.g., a combination of bus, cab, and flight) from the user 126 via the input. The MaaS mobility service may include, for example, a train service, a bus service, a taxi/cab service, a metro rail service, an air-plane service, a fleet service, a ride hailing service, a car sharing service, a carpool service, a car rental service, a bike sharing service, or a combination thereof.

Each mobility provider may enjoy secure data ownership of the transaction data through the distributed ledger 118. Since, the first MaaS network 102 is implemented using the distributed ledger 118, each mobility provider may own a node on the distributed ledger 118. The respective node of the distributed ledger 118 associated with a mobility provider may store transaction data relevant to the mobility provider. The respective node of the distributed ledger 120 may also store the same transaction data. This may ensure secure ownership of data amongst the MaaS provider and the mobility providers. This may also enhance connectivity between the various mobility providers. With sharing of Information Technology (IT) infrastructure amongst the mobility providers, costs associated with owned IT infrastructure for each mobility provider may be less as compared to costs when each mobility provider maintains its own closed-platform IT infrastructure. The transaction flow management based on operational troubles on multiple-connected MaaS networks is described further, for example, in FIG. 2.

FIG. 2 is a diagram of an exemplary network environment for transaction flow management based on operational troubles on nodes of multiple-connected Mobility-as-a-Service (MaaS) networks, in accordance with an embodiment of the disclosure. FIG. 2 is described with reference to elements from FIG. 1. With reference to FIG. 2, there is shown a block diagram of a network environment 200. The network environment 200 may include the first MaaS network 102 and a second MaaS network 202, each of which may be associated with a publish-subscribe pattern. Each of the first MaaS network 102 and the second MaaS network 202 may include the plurality of publisher nodes 110A, 110B, ... 110N. The first MaaS network 102 may include the first plurality of subscriber nodes 116A, 116B, ... 116N, and similar to the first MaaS network 102, the second MaaS network 202 may include a second plurality of subscriber nodes 208A, 208B, ... 208N. Each of the plurality of publisher nodes 110A, 110B, ... 110N, each of the first plurality of subscriber nodes 116A, 116B, ... 116N, and each of the second plurality of subscriber nodes 208A, 208B, ... 208N may be communicatively coupled to an intelligent broker 206.

The second plurality of subscriber nodes 208A, 208B, ... 208N of the second MaaS network 202 may be similar to the first plurality of subscriber nodes 116A, 116B, ... 116N, and may include a first subscriber node 208A, a second subscriber node 208B, ... and an Nth subscriber node 208N. Similar to the first MaaS network 102, the first subscriber node 208A may be associated with a MP node 210A, and a MaaS node 212A. Further, the second subscriber node 208B may be associated with a MP node 210B, and a MaaS node 212B. Similarly, the Nth subscriber node 208N may be associated with an Nth MP node 210N, and a Nth MaaS node 212N.

Each of MP nodes 210A, 210B, ... 210N may correspond to a node of a distributed ledger 210 that may store transaction data of a respective mobility provider associated with the second MaaS network 202. Each of the MaaS nodes 212A, 212B, ... 212N may correspond to a node of a distributed ledger 212 that may store transaction data of all mobility providers associated with the second MaaS network 202.

In FIG. 2, there is shown the user 126 who may interact with the plurality of publisher nodes 110A, 110B, ... 110N to avail mobility services of different mobility providers associated with one or more MaaS networks, such as the first MaaS network 102 and the second MaaS network 202. The network environment 100 may further include the administrator device 122 to monitor node operations of the first MaaS network 102 and the second MaaS network 202.

The network environment 200 may further include a node management device 204 communicatively coupled to the intelligent broker 206. The node management device 204 may include suitable logic, circuitry, code, and/or interfaces that may be configured to initialize a recovery of operationally troubled node(s) of the first MaaS network 102 and/or the second MaaS network 202. Examples of the node management device 204 may include, but are not limited to, a mobile diagnostic computer, a web server, an edge device, an edge node, a cloud server, a cluster of cloud-based servers, a workstation, or any computing device or system with a fog computing capability.

The functions of the second plurality of subscriber nodes, MP nodes, and MaaS nodes of the second MaaS network 202 may be same as the functions of the first plurality of subscriber nodes, MP nodes, MaaS nodes of the first MaaS network 102, as described, for example, in FIG. 1. Therefore, the description of these nodes is omitted from the disclosure for the sake of brevity.

As shown in FIG. 2, the intelligent broker 206 may support a set of message routing policies, such as situation-based routing policies 206A and trouble-based routing policies 206B. The broker node device 112 may implement one of the situation-based routing policies 206A and/or the trouble-based routing policies 206B to handle the transaction flow from publisher nodes to subscriber nodes, and from the subscriber nodes to the nodes (MP nodes or MaaS nodes) of a distributed ledger. For example, if there is an operational trouble on any node of the first MaaS network 102 and the second MaaS network 202, the trouble-based routing policies 206B may be used to select alternate publisher nodes, alternate subscriber nodes, or a backup node to temporarily store transaction messages.

In order to efficiently handle the transaction flow, the broker node device 112 may measure loads or overheads associated with nodes of the first MaaS network 102 and the second MaaS network 202. The situation-based routing policies 206A may determine efficient strategies to reduce/balance the measured loads or the overheads associated with the nodes of the first MaaS network 102 and the second MaaS network 202. The situation-based routing policies 206A may include, but are not limited to, an intra-routing policy, an inter-routing policy, a region-based routing policy, a traffic-based routing policy, and a cost-based routing policy.

In an embodiment, the intra-routing policy may be a message routing policy based on which the broker node device 112 may be configured to route a transaction message (received from a publisher node associated with a first mobility provider) to a subscriber node associated with a second mobility provider different from the first mobility provider, within the first MaaS network 102. The intra-routing policy may specify an option to route transaction messages for subscriber nodes of one mobility provider to other subscriber nodes of the other mobility provider within a MaaS network. For example, the broker node device 112 may receive a transaction message from the first publisher node 110A of a first mobility provider. In case there is an operational trouble associated with the first subscriber node 116A of the same first mobility provider, the broker node device 112 may route the transaction message received from the first publisher node 110A to the second subscriber node 116B of the second mobility provider (which may be different from the first mobility provider).

In an embodiment, an inter-routing policy may be a message routing policy based on which the broker node device 112 may be configured to route a transaction message (received from a publisher node of the first MaaS network 102) to a subscriber node of the second MaaS network 202 different from the first MaaS network 102. The inter-routing policy may specify an option to route transaction messages for subscriber nodes of a first mobility provider in the first MaaS network 102 to subscriber nodes of a different mobility provider in the second MaaS network 202. For example, the broker node device 112 may receive a transaction message from the first publisher node 110A of the first MaaS network 102. In case there is an operational trouble associated with the first subscriber node 116A, the broker node device 112 may route the transaction message received from the first publisher node 110A to the first subscriber node 208A of the second MaaS network 202.

In an embodiment, the region-based routing policy may be a message routing policy based on which the broker node device 112 may be configured to route a transaction message from a publisher node of the first MaaS network 102 in a first geographical region to a subscriber node of the first MaaS network 102 or the second MaaS network 202, in a second geographical region different from the first geographical region. The region-based routing policy may specify an option to select a geographic location and to route transaction messages to subscriber nodes of a mobility provider on a MaaS network associated with the selected geographic location (similar to regional or international roaming). As an example, the broker node device 112 may receive a transaction message from the first publisher node 110A of the first MaaS network 102 in a first geographical region. In case there is an operational trouble associated with the first subscriber node 116A, the broker node device 112 may route the transaction message to the first subscriber node 208A of the second MaaS network 202 in a second geographical region (different from the first geographical region). As another example, the broker node device 112 may route the transaction message received from the first publisher node 110A (of the first mobility provider) of the first MaaS network 102 to the second subscriber node 116B (of the second mobility provider) of the second MaaS network 202, in case the first subscriber node 116A is operationally troubled.

The traffic-based routing policy may specify an option to route transaction messages to suitable subscriber nodes of same or different mobility providers under peak traffic conditions. Such conditions may be based on road congestions that may be experienced by on-fleet vehicles of one or more mobility providers. The broker node device 112 may use the traffic-based routing policy to handle high volume transaction messages during peak traffic time. The broker node device 112 may use the collected traffic information, such as traffic congestion information, traffic collision information, detour information, or less than average traffic information to select the traffic-based routing policy as the first message routing policy. In an embodiment, the broker node device 112 may select the traffic-based routing policy when the operational trouble includes an inability of an operationally troubled publisher node (e.g., the first publisher node 110A) to process ticket transactions due to unavailability of a transport vehicle at a planned trip time or a delayed arrival of the transport vehicle for a pickup or drop in comparison to the planned trip time.

The cost-based routing policy may specify an option to route transaction messages based on costs of different routes between publisher nodes and subscriber nodes. Herein, if network overheads or loads are considered on the client layer, the broker layer, and the server layer of a MaaS network, the cost to route a transaction message from a publisher node to a subscriber node may be defined in terms of time it may take for the transaction message to reach the subscriber node from the publisher node. In some cases, the cost may be a transaction or ticket cost (in USD, for example) to route a transaction message to a subscriber node of a particular mobility provider.

The broker node device 112 may select the cost-based routing policy to route transaction messages from the first publisher node 110A to a subscriber node which incurs lowest cost (such as lowest time or a shortest route) as compared to rest of available subscriber nodes of the first MaaS network 102 or the second MaaS network 202. For example, the broker node device 112 may calculate a delay for each message route which includes a path from a publisher node to a subscriber node. The broker node device 112 may select a route for which the calculated delay is below a threshold value and may route the transaction message to the subscriber node in the selected route.

In an example scenario, the broker node device 112 may select one of the trouble-based routing policies 206B as the first message routing policy based on the operational trouble associated with operationally troubled node(s) of the first MaaS network 102 or the second MaaS network 202. Such selection may be further based on conditions, such as a burst-receipt of transaction messages, a down-trouble experienced by a node, a roundabout-trouble experienced by a node, or a requirement to balance a load associated with different routes of transaction messages. The conditions may also include a first condition associated with joining of new nodes, a second condition associated with splitting of existing nodes into two new nodes, a third condition associated with rerouting of transaction messages to a different MaaS network or a subscriber node of a different mobility provider to allow a roaming option for users, or a transfer of ticket to a publisher node of a mobility provider different from a mobility provider which issued the ticket.

In operation, the broker node device 112 may collect operation information associated with the first plurality of nodes of the first MaaS network 102. The broker node device 112 may also collect operation information associated with the second plurality of nodes of the second MaaS network 202. Examples of the collected operation information may include, but are not limited to, a network connectivity status and a device operational status of each node of the first plurality of nodes and each node of the second plurality of nodes. The broker node device 112 may determine an operational trouble associated with one or more nodes (referred to as operationally troubled node(s)) of the first plurality of nodes of the first MaaS network 102 and the second plurality of nodes of the second MaaS network 202 based on the collected operation information. Examples of the determined operational trouble may include, but are not limited to, a network connectivity failure, an operational failure, an application error, an overload of message handling capacity, an inability to process ticket transactions due to unavailability of a transport vehicle at a planned trip time or a delayed arrival of the transport vehicle for a pickup or drop in comparison to the planned trip time.

Based on the determined operational trouble, the broker node device 112 may select a first message routing policy from a set of message routing policies (includes the situation-based routing policies 206A and the trouble-based routing policies 206B). The broker node device 112 may select the first message routing policy based on whether the operational troubled node(s) belong to the client layer 104, the server layer 108, or both. The first message routing policy may be selected further based on a type of operational trouble that may be faced by the operational troubled node(s).

In an embodiment, the broker node device 112 in the intelligent broker 206 may be configured to determine a certain policy as the selected the first message routing policy by calculation of a probability-based score associated with various factors that may influence transaction processing by one or more MaaS networks. Thus, the selection of the first message routing policy may be based on the calculated probability-based score that may be a tradeoff of the various factors associated with the transaction processing of the one or more MaaS networks. Examples of such factors may include, but are not limited to, a systemic risk mitigation for a MaaS network, remediation of operational and system troubles associated with the nodes of a MaaS network, cost benefits (e.g., price and/or user preference based benefits) to users of MaaS network, and cost benefits to mobility providers and/or to organizations which run the MaaS network. Examples of such factors may further include, but are not limited to, traffic optimization associated with mobility providers of the MaaS network, energy consumption and carbon emissions associated with the vehicles of mobility providers of the MaaS network, and user time consumption associated with transactions of the MaaS network.

The first message routing policy may be a trouble-based routing policy (one of the trouble-based routing policies 206B) or a situation-based routing policy (one of the situation-based routing policies 206A). Based on the selected first message routing policy, the broker node device 112 may receive a transaction message associated with a first trip plan of a user (e.g., the user 126). The transaction message may be received from a first node the first MaaS network 102 or the second MaaS network 202. As an example, the first node may be the first publisher node 110A of the plurality of publisher nodes 110A, 110B, . . . 110N. Herein, the first node may be different from the operationally troubled node(s) of the first MaaS network 102 and/or the second MaaS network 202.

In an embodiment, the broker node device 112 may select, as the first node, an alternate publisher node from the first plurality of nodes of the first MaaS network 102 or from the second plurality of nodes of the second MaaS network 202. The alternate publisher node may be selected based on the first message routing policy and a determination that the operationally troubled node(s) include an operationally troubled publisher node. For example, the broker node device 112 may determine that the first publisher node 110A of the first MaaS network 102 is operationally troubled. The operational trouble associated the first publisher node 110A may be caused by conditions, such as traffic congestion, vehicle accidents, unavailability of vehicles at scheduled time for pick-up or drop, or due to hardware/software faults. The broker node device 112 may select the first message routing policy for the first publisher node 110A based on the operational trouble and may select the alternate publisher node (such as the second publisher node 110B) based on the selected first message routing policy.

By way of example, and not limitation, in case other publisher nodes of the same mobility provide are operational, the alternate publisher node may be selected from a cluster of nodes of the same mobility provider which owns/manages the first publisher node 110A. In case other publisher nodes of the same mobility provide are not operational or are troubled operationally, the alternate publisher node may be selected from publisher nodes of another mobility provider. In case publisher nodes of several mobility providers within a geographical region are operationally troubled (for example, due to an accident), the alternate publisher node may be selected from publisher nodes of a mobility provider which operates in the second MaaS network 202 at a different geographical location.

By way of another example, and not limitation, if the operational trouble of the first publisher node 110A is caused by an overload on a message handling capacity of the first publisher node 110A, the broker node device 112 may select the alternate publisher node as one which is least congested from the plurality of publisher nodes 110A, 110B, . . . 110N.

By way of another example, and not limitation, if the operational trouble of the first publisher node 110A is caused by a network connectivity failure, an operational failure, or an application error, the broker node device 112 may select the alternate publisher node as a node which is in vicinity of the first publisher node 110A and is of the same mobility provider. For instance, the alternate publisher node may be on the same station on which the first publisher node 110A is present.

By way of another example, and not limitation, the operational trouble of the first publisher node 110A may include an inability to process ticket transactions due to unavailability of a transport vehicle at a planned trip time or a delayed arrival of the transport vehicle for a pickup or drop in comparison to the planned trip time. In such a scenario, the broker node device 112 may select the first message routing policy as one of the situation-based routing policies 206A. For instance, the selected first message routing policy may be a traffic-based routing policy based on which the broker node device 112 may select an alternate publisher node of a different mobility provider whose transport vehicle may be available for a pickup or drop for the same trip plan. For example, the first publisher node 110A may be a publisher node of a taxi service provider whose vehicle may be unable to reach the user 126 for a pickup and drop for a first trip plan or may be delayed due to traffic congestion or a road accident. The second publisher node 110B may be a publisher node of a bus service provider whose vehicle may be available in the vicinity of the user 126 and may be available for a pick-up and drop as per the first trip plan of the user 126. In such a scenario, the broker node device 112 may select the second publisher node 110B as the alternate publisher node.

The broker node device 112 may receive the transaction message associated with the first trip plan from the alternate publisher node. In an embodiment, the alternate publisher node (such as the second publisher node 110B) may be associated with a first mobility provider which may be different from a second mobility provider associated with the operationally troubled publisher node (such as the first publisher node 110A). In such a case, the received transaction message may correspond to an unplanned or unpurchased ticket transaction arranged in place of a ticket transaction which may be handled by one of the operationally troubled node(s).

The broker node device 112 may route the received transaction message to a second node of the first MaaS network 102 or the second MaaS network 202. As an example, the second node may be a subscriber node (such as the first subscriber node 116A) associated with the first MaaS network 102 or the second MaaS network 202. Herein, the second node may be different from the operationally troubled node(s) of the first MaaS network 102 and/or the second MaaS network 202.

In an embodiment, the broker node device 112 may select, as the second node, an alternate subscriber node (such as the second subscriber node 116B) from the first plurality of nodes of the first MaaS network 102 or from the second plurality of nodes of the second MaaS network 202. The alternate subscriber node may be selected based on the selected first message routing policy and a determination that the operationally troubled node(s) include an operationally troubled subscriber node. For example, the broker node device 112 may determine that the first subscriber node 116A of the first MaaS network 102 is operationally troubled. The broker node device 112 may select the first message routing policy for the first subscriber node 116A based on the operational trouble associated with the first subscriber node 116A. The broker node device 112 may further select the alternate subscriber node as the second node based on the selected first message routing policy.

By way of example, and not limitation, if the operational trouble of the first subscriber node 116A is caused by an overload of a message handling capacity of the first subscriber node 116A, the broker node device 112 may select the first message routing policy as one of the situation-based routing policies 206A. Based on the selected message routing policy, the broker node device 112 may determine the second subscriber node 116B as the alternate subscriber node as the message handling capacity of the second subscriber node 116B may not be overloaded.

By way of another example, and not limitation, if the operational trouble of the first subscriber node 116A is caused by a network connectivity failure, an operational failure, or an application error, the broker node device 112 may select an alternate subscriber node of a mobility provider which owns/manages the operationally troubled subscriber node. Alternatively, the alternate subscriber node may be selected from a cluster of subscriber nodes of another mobility provider on the first MaaS network 102 or the second MaaS network 202. For example, the broker node device 112 may select the first subscriber node 208A of the second MaaS network 202 as the alternate subscriber node for the operationally troubled first subscriber node (such as the first subscriber node 116A) of the first MaaS network 102.

The broker node device 112 may route the transaction message associated with the first trip plan to the alternate subscriber node. In an embodiment, the alternate subscriber node (such as the second subscriber node 116B) may be associated with a first mobility provider, which may be different from a second mobility provider associated with the operationally troubled subscriber node (such as the first subscriber node 116A).

By way of another example, and not limitation, the operational trouble of the first subscriber node 116A may be caused by unavailability or a fault on the MP node 118A or the MaaS node 120A associated with the first subscriber node 116A. In such a case, the broker node device 112 may select, as the second node, a backup node (such as the backup node 114) from the first plurality of nodes of the first MaaS network 102 or from the second plurality of nodes of the second MaaS network 202. The backup node may be selected based on the selected first message routing policy and a determination that the operationally troubled node(s) include an operationally troubled subscriber node and/or an operationally troubled node of a distributed ledger (one of the first MaaS network 102 or the second MaaS network 202). For example, the broker node device 112 may determine that both the first subscriber node 116A and the MP node 118A (or the MaaS node 120A) are operationally troubled. The operational trouble of the first subscriber node 116A, the MP node 118A, or the MaaS node 120A may be caused by a network connectivity failure, an operational failure, or an application error. As both the subscriber and ledger nodes are down, the transaction message from the broker node device 112 may need to be temporarily stored till the recovery of both the subscriber and ledger nodes is complete. The broker node device 112 may select a backup node as the second node based on the selected first message routing policy. The backup node may be a separate database node, a subscriber node (such as the second subscriber node 116B) of same or different mobility provider, or an MP node (such as the MP node 118B) of same or different mobility provider.

In an embodiment, the broker node device 112 may determine a number of transaction messages that may be handled by a node of a distributed ledger (such as a node of the distributed ledger 118 or the distributed ledger 120). The broker node device 112 may determine a trend associated with an increase or decrease in the determined number of transaction messages. In case the increase is greater than a first threshold or the number of transaction message is greater than a second threshold, the broker node device 112 may scale up the distributed ledger (such as the distributed ledger 118 or the distributed ledger 120) by addition of another node of a larger capacity than the current node. In another case, if the decrease in the number of transaction messages is smaller than a third threshold, the broker node device 112 may scale down the distributed ledger (such as the distributed ledger 118 or the distributed ledger 120) by a merger of two nodes of the distributed ledger.

In an embodiment, the broker node device 112 may route the received transaction message (which may be associated with the first trip plan) from the first node to the selected backup node (such as the backup node 114) for temporary storage of the routed transaction message at the backup node. In an embodiment, the node management device 204 may initialize a recovery of the operationally troubled subscriber node (such as the first subscriber node 116A) or the operationally troubled node (such as the MP node 118A) of the distributed ledger (such as the distributed ledger 118). For example, the node management device 204 may reboot or restart a server which hosts the operationally troubled node of the distributed ledger to initialize the recovery. In some cases, the node management device 204 may reinitialize/reset a network connectivity of the server, run diagnostic checks, or perform auto-repair of software associated with the operationally troubled subscriber node or the operationally troubled node of the distributed ledger. After the recovery is complete, the node management device 204 may instruct the backup node to reroute the stored transaction message to the operationally troubled subscriber node (which is now recovered) or the operationally troubled node (which is now recovered) of the distributed ledger.

The broker node device 112 may support recovery of transaction routing in case of accident of vehicles associated with various mobility providers. The broker node device 112 may log all transaction messages that may pass through the broker node device 112 and provide analysis of the logged transaction messages to the administrator device 122.

The broker node device 112 may maintain a messaging table to store routing configuration for inter-connections between different mobility providers and between a mobility provider and a MaaS network (such as the first MaaS network 102). Further, the broker node device 112 may support transaction/trip roaming amongst mobility providers (i.e., mobility providers) or multiple MaaS networks and provide dynamic incentive-based pricing to smoothen peak-time traffic and increase revenue associated with operations of the MaaS network(s) and the mobility providers. In addition, the broker node device 112 may support heterogenous company messaging based on use of a common messaging protocol for communication and routing (or re-routing) of transaction messages.

Through the node management device 204, each of the first MaaS network 102 and the second MaaS network 202 may provide bulk cluster management of the publisher nodes. Further, through the node management device 204, the respective MaaS network may select backup nodes for operationally troubled subscriber nodes and/or operationally troubled node(s) of the distributed ledger of the respective MaaS networks. The backup nodes may function as substitutes for the operationally troubled subscriber nodes and/or operationally troubled nodes of the distributed ledger of the respective MaaS network. All publisher nodes and subscriber nodes may follow set protocols to become operational on a MaaS network (such as the first MaaS network 102 or the second MaaS network 202). The set protocols may mandate a common security architecture (for publisher node authentication and authorization), a network protocol (e.g., HTTP, MQTT, AMQP, and the like), a uniform data request or response format (e.g., JSON, CSV, or XML format), and an API/data scheme. This may ensure that each publisher node follows a standard cluster-level configuration (such as a device profile including a company name, a company ID, a gate ID, a gate number, and the like) and a device-level certificate (i.e., an authentication credential). The standard cluster-level configuration and the set protocols may facilitate transport providers to deploy new publisher nodes or replace existing publisher nodes with a plug-and-play approach. This may facilitate the MaaS network to function as a homogeneous transportation network with interoperability between resources (such as publisher nodes) of the various mobility providers.

In contrast, a conventional publisher node, subscriber node, or node of the distributed ledger may have a proprietary configuration and proprietary connection methods to access and operationalize on the MaaS network. This may lead to interoperability issues with publisher nodes and subscriber nodes of other transport providers. In case of an urgent requirement, deployment of new or backup publisher nodes, subscriber nodes, or nodes of the distributed ledger may take more time than required.

Figure 3:
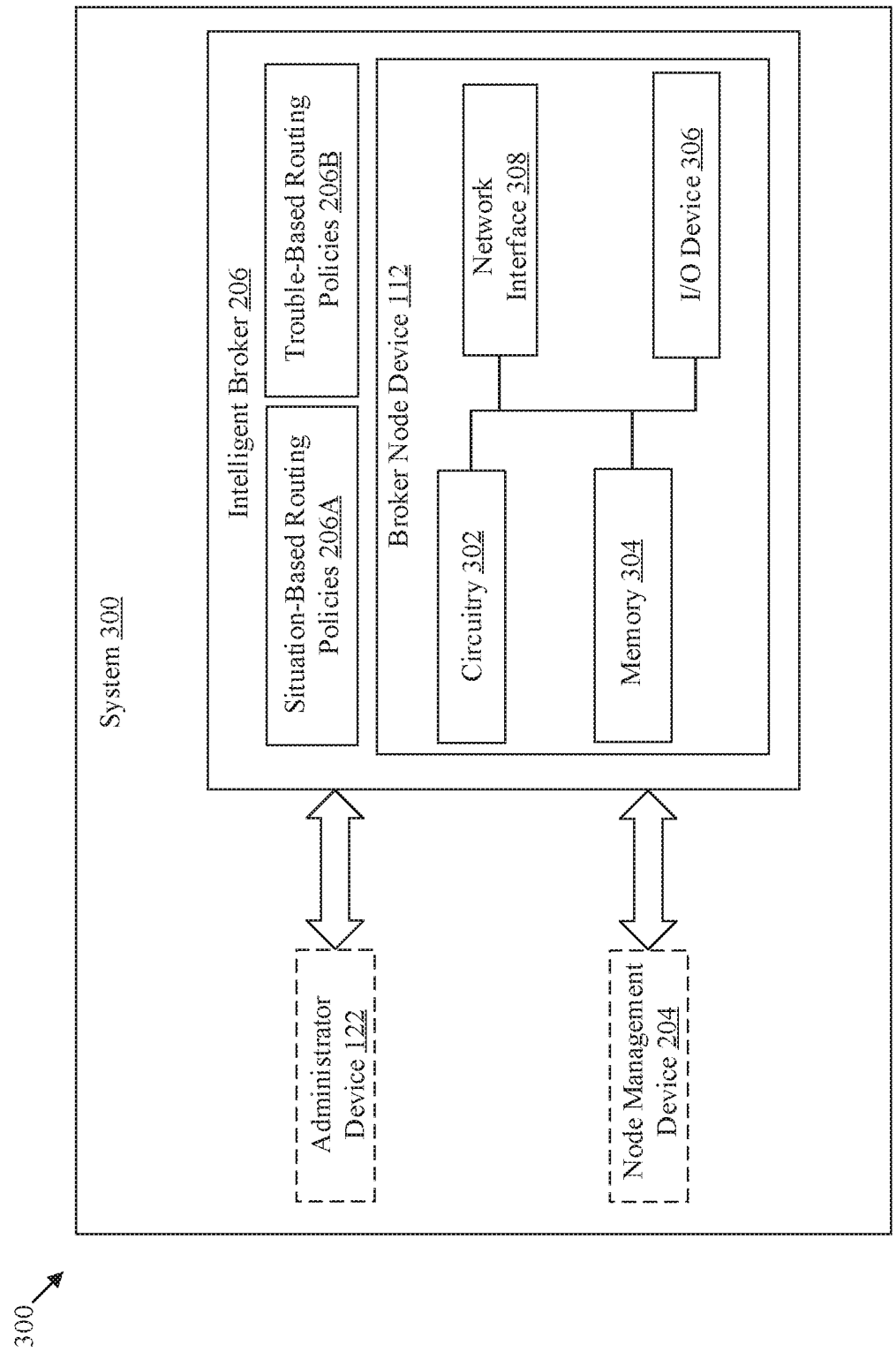
FIG. 3 is a block diagram of a system for transaction flow management based on operational troubles on Mobility-as-a-Service (MaaS) network(s), in accordance with an embodiment of the disclosure.

FIG. 3 is a block diagram of a system for transaction flow management based on operational troubles on Mobility-as-a-Service (MaaS) network(s), in accordance with an embodiment of the disclosure. FIG. 3 is explained in conjunction with elements from FIGS. 1 and 2. With reference to FIG. 3, there is shown a block diagram of a system 300. The system 300 may include an intelligent broker 206, which includes the broker node device 112 and stores a set of message routing policies, such as the situation-based routing policies 206A and the trouble-based routing policies 206B. In some embodiments, the system 300 may also include the node management device 204, and the administrator device 122.

The node management device 204 and the administrator device 122 may be communicatively coupled to the intelligent broker 206, via a suitable communication network (not shown). The broker node device 112 may include circuitry 302, a memory 304, an input/output (I/O) device 306, and a network interface 308. The circuitry 302 may be configured to communicate with the plurality of publisher nodes 110A, 1108, . . . 110N, the first plurality of subscriber nodes 116A, 116B, . . . 116N (and/or a second plurality of subscriber nodes 208A, 208B, . . . 208N), the node management device 204, and the administrator device 122 by use of the network interface 308.

The circuitry 302 may include suitable logic, circuitry, interfaces, and/or code that may be configured to execute instructions for operations to be executed by the broker node device 112. Examples of implementation of the circuitry 302 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 304 may include suitable logic, circuitry, code, and/or interfaces that may be configured to store the instructions executable by the circuitry 302. The memory 304 may also store the set of message routing policies, a messaging table, and a routing configuration table. Examples of implementation of the memory 304 may include, but are not limited to, Random Access Memory (RAM), Read Only Memory (ROM), Hard Disk Drive (HDD), and/or a Secure Digital (SD) card.

The I/O device 306 may include suitable logic, circuitry, and/or interfaces that may be configured to receive an input and provide an output based on the received input. The I/O device 306 may include various input and output devices, which may be configured to communicate with the circuitry 302. Examples of the I/O device 306 may include, but are not limited to, a touch screen, a keyboard, a mouse, a joystick, a display device, a microphone, or a speaker.

The network interface 308 may include suitable logic, circuitry, interfaces, and/or code that may be configured to establish a communication (such as a peer-to-peer static connection) between the broker node device 112 and each of the plurality of publisher nodes 110A, 110B, . . . 110N, the first plurality of subscriber nodes 116A, 116B, . . . 116N (and/or a second plurality of subscriber nodes 208A, 208B, . . . 208N), the node management device 204, and the administrator device 122. The network interface 308 may implement known technologies to support wired or wireless communication with the one or more communication networks.

The network interface 308 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 308 may communicate via wireless communication with networks, such as the Internet, an Intranet, and/or a wireless network, such as, a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e. 120 g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Similar to the broker node device 112, each of the administrator device 122 and the node management device 204 may include one or more components including a circuitry, a memory, a I/O device, a display device, and a network interface, with similar functions. The functions or operations executed by the broker node device 112, as described in FIGS. 1, 2, and 4, may be performed by the circuitry 302. Such operations are described in detail, for example, in FIGS. 1, 2, 4A, and 4B.

Figure 4A:
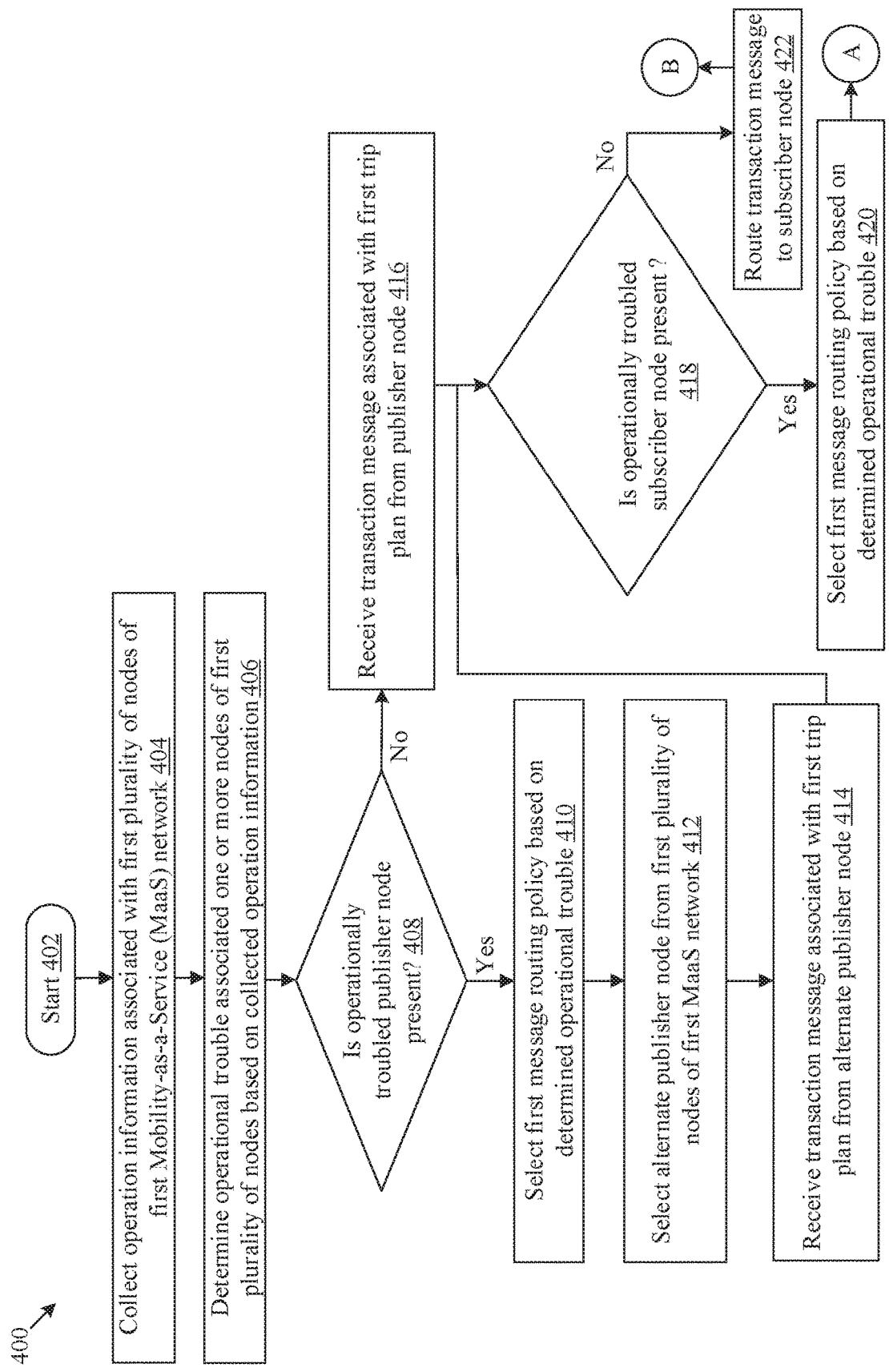
FIGS. 4A and 4B collectively depict a flowchart of an exemplary method for transaction flow management based on operational troubles on a Mobility-as-a-Service (MaaS) network, in accordance with an embodiment of the disclosure.
Figure 4B:
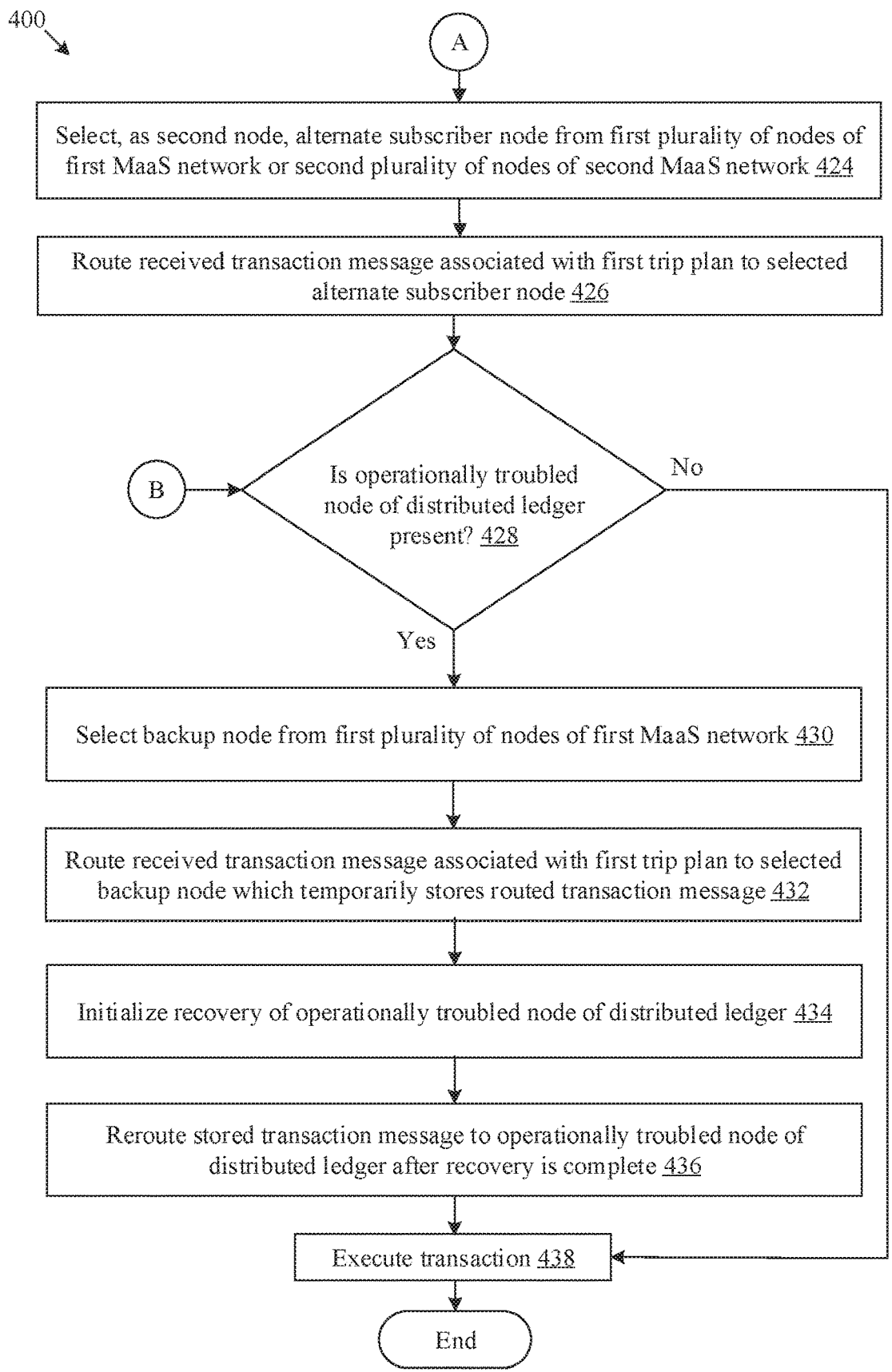

FIGS. 4A and 4B collectively depict a flowchart of an exemplary method for transaction flow management based on operational troubles on a Mobility-as-a-Service (MaaS) network, in accordance with an embodiment of the disclosure. FIGS. 4A and 4B are described in conjunction with elements from FIGS. 1, 2, and 3. With reference to FIGS. 4A and 4B, there is shown a flowchart 400. The exemplary method of the flowchart 400 may be executed by any computing system, for example, by the broker node device 112 of FIG. 1. The exemplary method of the flowchart 400 may start at 402 and proceed to 404.

At 404, operation information associated with the first plurality of nodes of the first MaaS network 102 may be collected. In an embodiment, the circuitry 302 of the broker node device 112 may be configured to collect the operation information associated with the first plurality of nodes of the first MaaS network 102. The collected operation information may include a network connectivity status and a device operational status of each node of the first MaaS network 102.

At 406, an operational trouble associated with one or more nodes of the first plurality of nodes of the first MaaS network 102 may be determined based on the collected operation information. In an embodiment, the circuitry 302 of the broker node device 112 may be configured to determine the operational trouble associated with the one or more nodes of the first plurality of nodes. The one or more nodes may be nodes that may handle ticket transactions associated with a trip plan of a sequence of trip plans included in a MaaS mobility service. For example, the one or more nodes may include publisher nodes of the first MaaS network 102, such as ticketing gates, applications, and/or PoS devices. In another example, the one or more nodes may include subscriber nodes of the first MaaS network 102 or nodes of a distributed ledger (e.g., the distributed ledger 118 or the distributed ledger 120) associated with the subscriber nodes of the first MaaS network 102. Examples of the operational trouble may include, but are not limited to, a network connectivity failure, an operational failure, an application error, an overload of message handling capacity, an inability to process ticket transactions due to unavailability of a transport vehicle at a planned trip time or a delayed arrival of the transport vehicle for a pickup or drop in comparison to the planned trip time.

At 408, it may be determined whether an operationally troubled publisher node is present in the first MaaS network 102. In an embodiment, the circuitry 302 of the broker node device 112 may be configured to check whether an operationally troubled publisher node is present in the first MaaS network 102. In case the operationally troubled publisher node (such as the first publisher node 110A) is present, control may pass to 410, otherwise control may pass to 416.

At 410, the first message routing policy may be selected based on the determined operational trouble. In an embodiment, the circuitry 302 of the broker node device 112 may be configured to select the first message routing policy from a set of message routing policies, such as the situation-based routing policies 206A and/or the trouble-based routing policies 206B. The selection of the first message routing policy may be based on the type of the operational trouble associated with the operationally troubled publisher node. The selection of the first message routing policy is described further, for example, in FIGS. 1 and 2.

At 412, an alternate publisher node (such as the second publisher node 110B) may be selected from the first plurality of nodes of the first MaaS network 102. In an embodiment, the circuitry 302 of the broker node device 112 may be configured to select the alternate publisher node from the first plurality of nodes of the first MaaS network 102. The selection of the alternate publisher node is explained further, for example, in FIGS. 1 and 2.

At 414, the transaction message associated with the first trip plan of the user may be received from the alternate publisher node (such as the second publisher node 110B). In an embodiment, the circuitry 302 of the broker node device 112 may be configured to receive the transaction message associated with the first trip plan from the alternate publisher node.

At 416, the transaction message associated with the first trip plan of the user may be received from a publisher node (such as the first publisher node 110A) of the first MaaS network 102. In an embodiment, the circuitry 302 of the broker node device 112 may be configured to receive the transaction message associated with the first trip plan from the alternate publisher node.

At 418, it may be determined whether an operationally troubled subscriber node is present in the first MaaS network 102. In an embodiment, the circuitry 302 of the broker node device 112 may be configured to check whether an operationally troubled subscriber node is present in the first MaaS network 102. In case the first MaaS network 102 includes an operationally troubled subscriber node (such as the first subscriber node 116A), control may pass to 420, otherwise control passes to 422.

At 420, the first message routing policy may be selected based on the determined operational trouble. In an embodiment, the circuitry 302 of the broker node device 112 may be configured to select the first message routing policy from a set of message routing policies, such as the situation-based routing policies 206A and/or the trouble-based routing policies 206B. The selection of the first message routing policy may be based on the type of the operational trouble associated with the operationally troubled subscriber node. The selection of the first message routing policy is described further, for example, in FIGS. 1 and 2.

At 422, the transaction message may be routed to a subscriber node (such as the first subscriber node 116A) of the first MaaS network 102. In an embodiment, the circuitry 302 of the broker node device 112 may be configured to route the transaction message to the subscriber node (such as the first subscriber node 116A) of the first MaaS network 102. Control may pass to 428.

At 424, an alternate subscriber node (such as the second subscriber node 116B) may be selected from the first plurality of nodes of the first MaaS network 102. In an embodiment, the circuitry 302 of the broker node device 112 may be configured to select the alternate subscriber node from the first plurality of nodes of the first MaaS network 102. The selection of the alternate subscriber node may be based on the selected first message routing policy (at 420). Details associated with the selection are explained further, for example, in FIGS. 1 and 2.

At 426, the received transaction message associated with the first trip plan of the user may be routed to the alternate subscriber node (such as the second subscriber node 116B). In an embodiment, the circuitry 302 of the broker node device 112 may be configured to route the received transaction message associated with the first trip plan to the alternate subscriber node.

At 428, it may be determined whether an operationally troubled node of a distributed ledger (such as the distributed ledger 118 or the distributed ledger 120) is present in the first MaaS network 102. In an embodiment, the circuitry 302 of the broker node device 112 may be configured to check whether an operationally troubled subscriber node is present in the first MaaS network 102. In case the first MaaS network 102 includes an operationally troubled node (such as the MP node 118A of the distributed ledger 118), control may pass to 430, otherwise control passes to 438.

At 430, the backup node (such as the backup node 114) may be selected from the first plurality of nodes of the first MaaS network 102. In an embodiment, the circuitry 302 of the broker node device 112 may be configured to select the backup node from the first plurality of nodes of the first MaaS network 102. The selection of the backup node for the operationally troubled subscriber node or the operationally troubled node of the distributed ledger is explained further, for example, in FIGS. 1 and 2.

At 432, the received transaction message associated with the first trip plan of the user may be routed to the selected backup node. In an embodiment, the circuitry 302 of the broker node device 112 may be configured to route the received transaction message associated with the first trip plan to the selected backup node. The backup node may be configured to temporarily store the routed transaction message.

At 434, a recovery of the operationally troubled node (such as the MP node 118A) of the distributed ledger may be initialized. In an embodiment, the node management device 204 may be configured to initialize the recovery of the operationally troubled node (such as the MP node 118A) of the distributed ledger.

At 436, after the recovery is complete, the stored transaction message may be rerouted to the operationally troubled node (such as the MP node 118A) of the distributed ledger. The node management device 204 may be configured to instruct the backup node (such as the backup node 114) to reroute the stored transaction message to the operationally troubled node (such as the MP node 118A) after the recovery is complete.

At 438, the received transaction message may be executed. In an embodiment, after the recovery, the operationally troubled node (such as the MP node 118A) may execute a transaction on the distributed ledger (such as the distributed ledger 118) based on the transaction message (rerouted at 436). In another embodiment, in case the first MaaS network 102 does not include any operationally troubled node, a receiving node (such as the MP node 118A) may execute the transaction based on the transaction message. Control may pass to end.

Although the flowchart 400 is illustrated as discrete operations, such as 404, 406, 408, 410, 412, 414, 416, 418, 420, 422, 424, 426, 428, 430, 432, 434, 436, and 438, the disclosure is not so limited. Accordingly, in certain embodiments, such discrete operations may be further divided into additional operations, combined into fewer operations, or eliminated, depending on the particular implementation without detracting from the essence of the disclosed embodiments.

Exemplary aspects of the disclosure may include a system (such as the system 300) that may include a broker node device (such as the broker node device 112), a node management device (such as the node management device 204), and an administrator device (such as the administrator device 122). The broker node device 112 may be configured to collect operation information associated with a first plurality of nodes of a first Mobility-as-a-Service (MaaS) network (such as the first MaaS network 102). The broker node device 112 may be further configured to determine an operational trouble associated one or more nodes of the first plurality of nodes based on the collected operation information. The one or more nodes may handle ticket transactions associated with a first trip plan of a sequence of trip plans included in a MaaS mobility service. The broker node device 112 may be further configured to select, from a set of message routing policies, a first message routing policy based on the determined operational trouble. The broker node device 112 may be further configured to receive, based on the selected first message routing policy, a transaction message associated with the first trip plan from a first node of the first plurality of nodes. Further, the broker node device 112 may be configured to route the received transaction message to a second node of the first plurality of nodes based on the selected first message routing policy.

In an embodiment, the broker node device 112 may be further configured to collect traffic information associated with an on-road fleet of transport vehicles of one or more mobility providers affiliated to the first MaaS network 102. The collected traffic information may include traffic congestion information, traffic collision information, detour information, or less than average traffic information. The broker node device 112 may be configured to determine the operational trouble associated the one or more nodes of the first plurality of nodes further based on the collected traffic information. The collected operation information may include a network connectivity status and a device operational status of each node of the first plurality of nodes. The determined operational trouble may include at least one of a network connectivity failure associated with the one or more nodes, an operational failure of the one or more nodes, an application error on the one or more nodes, or an overload of a message handling capacity of the one or more nodes. The determined operational trouble may further include an inability of the one or more nodes to process the ticket transactions due to unavailability of a transport vehicle at a planned trip time or a delayed arrival of the transport vehicle for a pickup or drop in comparison to the planned trip time.

In an embodiment, the first node and the second node may be different from the one or more nodes. In an embodiment, the first node and the second node may be associated with a first mobility provider which may be different from a second mobility provider associated with the one or more nodes of the first MaaS network 102.

In an embodiment, the broker node device 112 may be configured to control an administrator device 122 to display information comprising the determined operational trouble, the collected operation information, and traffic information associated with an on-road fleet of transport vehicles of one or more mobility providers affiliated to the first MaaS network 102. The broker node device 112 may be configured to control the administrator device 122 to display a set of user-selectable options corresponding to the set of message routing policies based on the displayed information. The broker node device 112 may be further configured to receive, via the administrator device 122, an admin input comprising a selection of a first user-selectable option of the set of user-selectable options. The first message routing policy may be selected based on the received admin input.

In an embodiment, the broker node device 112 may be configured to select, as the first node, an alternate publisher node from the first plurality of nodes of the first MaaS network 102 or from a second plurality of nodes of a second MaaS network (such as the second MaaS network 202) different from the first MaaS network 102. The alternate publisher node may be selected based on the selected first message routing policy and a determination that the one or more nodes include an operationally troubled publisher node. The broker node device 112 may be configured to receive the transaction message associated with the first trip plan from the selected alternate publisher node. In an embodiment, the received transaction message may correspond to an unplanned or unpurchased ticket transaction arranged in place of the ticket transactions handled by the one or more nodes. The selected alternate publisher node may be associated with a first mobility provider which may be different from a second mobility provider associated with the operationally troubled publisher node.

In an embodiment, the broker node device 112 may be configured to select, as the second node, an alternate subscriber node from the first plurality of nodes of the first MaaS network 102 or from a second plurality of nodes of the second MaaS network 202 different from the first MaaS network 102. The alternate subscribe node may be selected based on the selected first message routing policy and a determination that the one or more nodes include an operationally troubled subscriber node. The broker node device 112 may be configured to route the received transaction message associated with the first trip plan to the selected alternate subscriber node. The selected alternate subscriber node may be associated with a first mobility provider which may be different from a second mobility provider associated with the operationally troubled subscriber node.

In an embodiment, the broker node device 112 may be configured to select, as the second node, a backup node from the first plurality of nodes of the first MaaS network 102 or from a second plurality of nodes of the second MaaS network 202 different from the first MaaS network 102. The backup node may be selected based on the selected first message routing policy and a determination that the one or more nodes include an operationally troubled subscriber node or an operationally troubled node of a distributed ledger (e.g., the distributed ledger 118 or the distributed ledger 120) included in the first MaaS network 102. The broker node device 112 may be configured to route the received transaction message associated with the first trip plan to the selected backup node which may temporarily store the routed transaction message.

In an embodiment, the node management device 204 may be configured to initialize a recovery of the operationally troubled subscriber node or the operationally troubled node of the distributed ledger (e.g., the distributed ledger 118 or the distributed ledger 120). After the recovery is complete, the node management device 204 may be configured to instruct the backup node to reroute the stored transaction message to the operationally troubled subscriber node or the operationally troubled node of the distributed ledger.

In an embodiment, the first message routing policy may correspond to one of an intra-routing policy, an inter-routing policy, or a region-routing policy. The intra-routing policy may correspond to a routing policy in which the broker node device 112 may route a transaction message received from a publisher node associated with a first mobility provider to a subscriber node associated with a second mobility provider different from the first mobility provider, within a same first MaaS network 102. The inter-routing policy may correspond to a routing policy in which the broker node device 112 may route a transaction message received from a publisher node of the first MaaS network 102 to a subscriber node of the second MaaS network 202 different from the first MaaS network 102. The region-routing policy may correspond to a routing policy in which the broker node device 112 may route a transaction message received from a publisher node of the first MaaS network 102, in a first geographical region, to a subscriber node of the first MaaS network 102 or the second MaaS network 202, in a second geographical region different from the first geographical region.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
a broker node device configured to:
  collect operation information associated with a first plurality of nodes of a first Mobility-as-a-Service (MaaS) network;
  determine an operational trouble associated with one or more nodes of the first plurality of nodes based on the collected operation information,
    wherein the one or more nodes handle ticket transactions associated with a first trip plan of a sequence of trip plans included in a MaaS mobility service;
  select, from a set of message routing policies, a first message routing policy based on the determined operational trouble;
  receive, based on the selected first message routing policy, a transaction message associated with the first trip plan from a first node of the first plurality of nodes; and
  route the received transaction message to a second node of the first plurality of nodes based on the selected first message routing policy, wherein the first node and the second node are different from the one or more nodes.

2. The system according to claim 1, wherein the broker node device is further configured to collect traffic information associated with an on-road fleet of transport vehicles of one or more mobility providers affiliated to the first MaaS network, and the collected traffic information comprises at least one of traffic congestion information, traffic collision information, detour information, or less than average traffic information.

3. The system according to claim 2, wherein the broker node device is further configured to determine the operational trouble associated with the one or more nodes of the first plurality of nodes based on the collected traffic information.

4. The system according to claim 1, wherein the collected operation information comprises a network connectivity status and a device operational status of each node of the first plurality of nodes.

5. The system according to claim 1, wherein the determined operational trouble comprises at least one of:
a network connectivity failure associated with the one or more nodes,
an operational failure of the one or more nodes,
an application error on the one or more nodes,
an overload of a message handling capacity of the one or more nodes, or
an inability of the one or more nodes to process the ticket transactions due to unavailability of a transport vehicle at a planned trip time or a delayed arrival of the transport vehicle for a pickup or drop in comparison to the planned trip time.

6. The system according to claim 1, wherein the first node and the second node are associated with a first mobility provider which is different from a second mobility provider associated with the one or more nodes of the first MaaS network.

7. The system according to claim 1, wherein the broker node device is further configured to:
control an administrator device to display information comprising the determined operational trouble, the collected operation information, and traffic information associated with an on-road fleet of transport vehicles of one or more mobility providers affiliated to the first MaaS network;
control the administrator device to display a set of user-selectable options corresponding to the set of message routing policies based on the displayed information;
receive, via the administrator device, an admin input comprising a selection of a first user-selectable option of the set of user-selectable options; and
select the first message routing policy based on the received admin input.

8. The system according to claim 1, wherein the broker node device is further configured to:
select, as the first node, an alternate publisher node from the first plurality of nodes of the first MaaS network or from a second plurality of nodes of a second MaaS network different from the first MaaS network,
wherein the alternate publisher node is selected based on the selected first message routing policy and a determination that the one or more nodes comprise an operationally troubled publisher node; and
receive the transaction message associated with the first trip plan from the selected alternate publisher node.

9. The system according to claim 8, wherein the received transaction message corresponds to an unplanned or unpurchased ticket transaction arranged in place of the ticket transactions handled by the one or more nodes.

10. The system according to claim 8, wherein the selected alternate publisher node is associated with a first mobility provider which is different from a second mobility provider associated with the operationally troubled publisher node.

11. The system according to claim 1, wherein the broker node device is further configured to:
select, as the second node, an alternate subscriber node from the first plurality of nodes of the first MaaS network or from a second plurality of nodes of a second MaaS network different from the first MaaS network,
wherein the alternate subscriber node is selected based on the selected first message routing policy and a determination that the one or more nodes comprise an operationally troubled subscriber node; and
route the received transaction message associated with the first trip plan to the selected alternate subscriber node.

12. The system according to claim 11, wherein the selected alternate subscriber node is associated with a first mobility provider which is different from a second mobility provider associated with the operationally troubled subscriber node.

13. The system according to claim 1, wherein the broker node device is further configured to:
select, as the second node, a backup node from the first plurality of nodes of the first MaaS network or from a second plurality of nodes of a second MaaS network different from the first MaaS network,
wherein the backup node is selected based on the selected first message routing policy and a determination that the one or more nodes comprise an operationally troubled subscriber node or an operationally troubled node of a distributed ledger included in the first MaaS network; and
route the received transaction message associated with the first trip plan to the selected backup node which temporarily stores the routed transaction message.

14. The system according to claim 13, further comprising a node management device configured to:
initialize a recovery of the operationally troubled subscriber node or the operationally troubled node of the distributed ledger; and
after the recovery is complete, instruct the backup node to reroute the stored transaction message to the operationally troubled subscriber node or the operationally troubled node of the distributed ledger.

15. The system according to claim 1, wherein the broker node device is further configured to select the first message routing policy as one of:
an intra-routing policy based on which the broker node device routes a transaction message received from a publisher node associated with a first mobility provider to a subscriber node associated with a second mobility provider different from the first mobility provider, within the same first MaaS network,
an inter-routing policy based on which the broker node device routes a transaction message received from a publisher node of the first MaaS network to a subscriber node of a second MaaS network different from the first MaaS network, or
a region-based routing policy based on which the broker node device routes the transaction message received from the publisher node of the first MaaS network, in a first geographical region, to a subscriber node of the first MaaS network or the second MaaS network in a second geographical region different from the first geographical region.

16. A method, comprising:
in a system comprising a broker node device:
collecting, by the broker node device, operation information associated with a first plurality of nodes of a first Mobility-as-a-Service (MaaS) network;
determining, by the broker node device, an operational trouble associated with one or more nodes of the first plurality of nodes based on the collected operation information,
wherein the one or more nodes handle ticket transactions associated with a first trip plan of a sequence of trip plans included in a MaaS mobility service;
selecting, by the broker node device, a first message routing policy from a set of message routing policies based on the determined operational trouble;
receiving, by the broker node device, a transaction message associated with the first trip plan from a first node of the first plurality of nodes, based on the selected first message routing policy; and
routing, by the broker node device, the received transaction message to a second node of the first plurality of nodes based on the selected first message routing policy,
wherein the first node and the second node are different from the one or more nodes.

17. The method according to claim 16, further comprising collecting, by the broker node device, traffic information associated with an on-road fleet of transport vehicles of one or more mobility providers affiliated to the first MaaS network,
wherein the collected traffic information comprises at least one of traffic congestion information, traffic collision information, detour information, or less than average traffic information.

18. The method according to claim 17, further comprising determining the operational trouble associated with the one or more nodes of the first plurality of nodes based on the collected traffic information.

19. The method according to claim 16, wherein the determined operational trouble comprises at least one of:
a network connectivity failure associated with the one or more nodes,
an operational failure of the one or more nodes,
an application error on the one or more nodes,
an overload of a message handling capacity of the one or more nodes, or
an inability of the one or more nodes to process the ticket transactions due to unavailability of a transport vehicle at a planned trip time or a delayed arrival of the transport vehicle for a pickup or drop in comparison to the planned trip time.

20. The method according to claim 16, further comprising selecting the first message routing policy as one of:
an intra-routing policy based on which the broker node device routes a transaction message received from a publisher node associated with a first mobility provider to a subscriber node associated with a second mobility provider different from the first mobility provider, within the same first MaaS network,
an inter-routing policy based on which the broker node device routes a transaction message received from a publisher node of the first MaaS network to a subscriber node of a second MaaS network different from the first MaaS network, or
a region-based routing policy based on which the broker node device routes the transaction message received from the publisher node of the first MaaS network, in a first geographical region to a subscriber node of the first MaaS network or the second MaaS network in a second geographical region different from the first geographical region.

* * * * *